United States Patent [19]

Ahola

[11] Patent Number: 4,574,373
[45] Date of Patent: Mar. 4, 1986

[54] DIGITAL MULTIPLEX DEVICE

[75] Inventor: Reijo Ahola, Espoo, Finland

[73] Assignee: Oy Noki AB, Helsinki, Finland

[21] Appl. No.: 567,854

[22] PCT Filed: Apr. 29, 1983

[86] PCT No.: PCT/FI83/00038
§ 371 Date: Dec. 23, 1983
§ 102(e) Date: Dec. 23, 1983

[87] PCT Pub. No.: WO83/03937
PCT Pub. Date: Nov. 10, 1983

[30] Foreign Application Priority Data
May 3, 1982 [FI] Finland .................................. 821550

[51] Int. Cl.$^4$ ........................... H04J 1/10; H04J 3/08; H04J 3/02; H04Q 11/04
[52] U.S. Cl. ......................................... 370/58; 370/55; 370/85
[58] Field of Search ....................... 370/55, 58, 85, 94, 370/60, 87, 88

[56] References Cited

U.S. PATENT DOCUMENTS

| | | | |
|---|---|---|---|
| 4,032,893 | 6/1977 | Moran | 370/85 |
| 4,124,776 | 11/1978 | Nocker | 370/87 |
| 4,205,326 | 5/1980 | Porter et al. | 370/86 |
| 4,370,744 | 1/1983 | Hirano et al. | 370/88 |

Primary Examiner—Douglas W. Olms
Assistant Examiner—Wellington Chin
Attorney, Agent, or Firm—Lowe King Price & Becker

[57] ABSTRACT

The invention relates to a digital multiplex device for branching a digital information stream. In relatively small individual telephone networks using digital transmission techniques and comprising a few intermediate stations and terminal stations, a need has arisen to branch groups having less than 30 channels. To branch such groups in a digital manner, i.e., without first decoding the signals to voice-frequency signals, a phase compensating device includes four switches, four time multiplexers, and two frame phasers and two control units for controlling the switches and time multiplexers. The device comprises two identical units, and is suitable for branching other digital information, besides data signals having a standard frame structure. Moreover, the transmission rate of the branched line may differ from that of the main line by using a rate modifier.

9 Claims, 3 Drawing Figures

DIGITAL MULTIPLEX DEVICE

FIELD OF THE INVENTION

The present invention relates to a digital multiplex device for branching a synchronous time multiplexed digital information stream, and more particularly to such a device comprising three four-wire bidirectional transmission gates provided with receivers and transmitters.

BACKGROUND ART

The development of digitized time division general telephone networks has resulted in a need to apply pulse-code modulated (PCM) information transmission methods to individual networks. In these networks, however, the typical 30-channel frame PCM structure produces structural problems and problems related to the quality of information transmission. If, e.g., it is desirable to branch fewer than 30 channels at some intermediate station of such an individual network, all of the 30 channels must be decoded to voice frequency signals and the branching must be performed by connections of these channels, which carry voice frequency signals. Up to three channelling devices must be provided at the station if the branched channels are to be transmitted to another station in digital form. If the channels must be decoded and coded again in this way at each intermediate station, interchannel crosstalk, changes in signal level, and noise may accumulate to disturb the transmission. Moreover, such a branching is quite expensive because of difficulties in installation and the large quantity of equipment required.

A particular problem in relation to individual networks is that the intermediate stations must be connected to both of the terminal stations. Under these circumstances, providing a single branch is not sufficient; but it must also be possible to use the transmission capacity of the main line thereby liberated to serve the connections between the particular intermediate station and the other terminal station.

It is an object of the present invention to provide a device for resolving the aforementioned problems and for performing the branching completely digital.

SUMMARY OF THE INVENTION

In accordance with the present invention an improved digital multiplex device that is relatively inexpensive and can be made in modular form branches a synchronous time multiplexed digital information stream between first, second and third ports. Each of the ports includes a transmitter and receiver. The device comprises first and second selectively activated phase controlling networks. Each of the networks includes: first and second input terminal means and first and second output terminal means, first and second time division multiplexers, first and second switch means and a phase changer. The first multiplexer is directly connected to the first input terminal means of the respective network. The phase changer has an input directly connected to the second input terminal means of the respective network and an output directly connected to a first input of the second multiplexer of the respective network. The first switch means selectively connects the first input terminal means of the network to the first output terminal means of the respective network or it connects a first output of the second phase changer to the first output means of the respective network. The second switch means selectively connects the second output terminal means to be responsive to an output of the first multiplexer of the respective network or to a second output of the second multiplexer of the respective network. The first input terminal means of the first and second networks are respectively responsive to output signals of the receivers of the first and second ports. The first output terminal means of the first and second networks respectively supply signals to inputs of the transmitters of the first and second ports. The second input terminal means of the second network is connected to the second output terminal means of the first network. The second input terminal means of the first network is connected to an output of the receiver of the third port. The second output terminal means of the second network is connected to an input of the transmitter of the third port.

The device in accordance with the present invention is also suitable for branching other sorts of information besides digital signals having a standard frame structure. Moreover, the transmission rate of the branched line may differ from that of the main line.

The above and still further objects, features and advantages of the present invention will become apparent upon consideration of the following detailed description of one specific embodiment thereof, especially when taken in conjunction with the accompanying drawings.

DESCRIPTION OF PREFERRED EMBODIMENT

Figure 1:
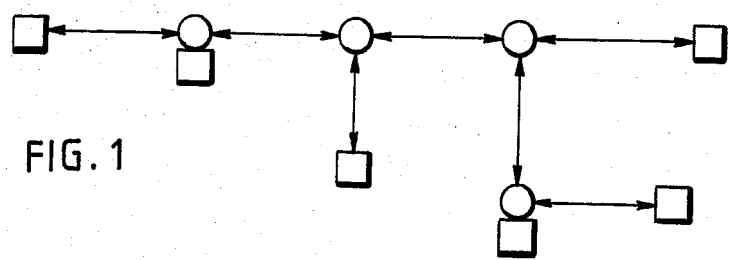
FIG. 1 is a schematic block diagram of a data communication network including a device in accordance with the invention.

FIG. 1 is an illustration of a branched network in which the branching has been accomplished by means of a device in accordance with the invention. In the figure, the squares denote channelling devices for encoding voice frequency signals to PCM signals, and the circles denote the branching devices which branch digital signals without decoding them to voice frequency signals. The network is synchronized by using a conventional Master-Slave synchronization method.

Figure 2:
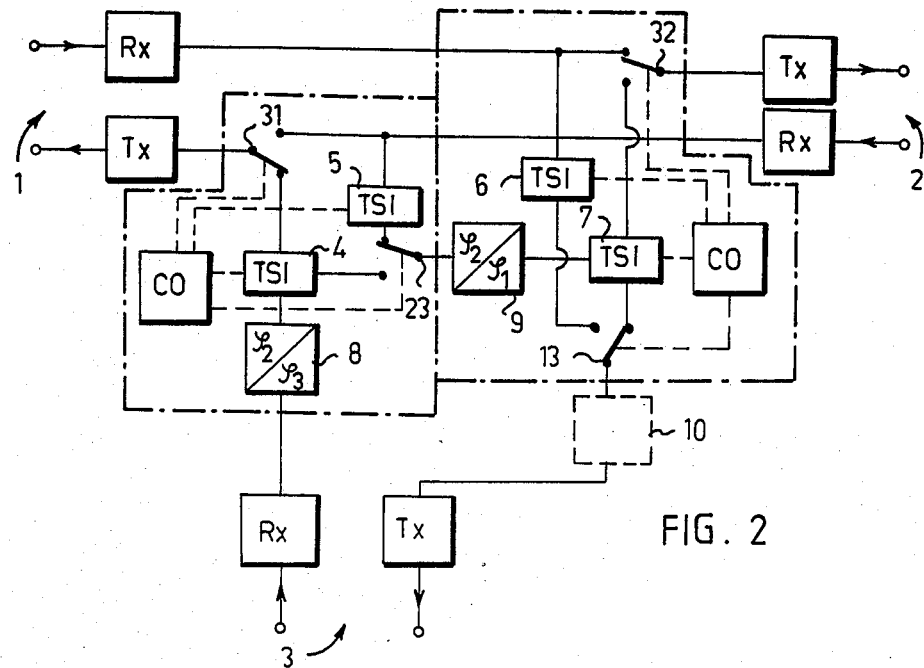
FIG. 2 is a schematic diagram of the device in accordance with the invention.

FIG. 2 is a more detailed circuit diagram of the digital branching device in accordance with the invention. The device comprises three ports 1, 2 and 3, each capable of bidirectional transmission. Each of ports 1, 2 and 3 includes a transmitter Tx and a receiver Rx. The transmitters Tx and receivers Rx perform frame and multiframe synchronization and are associated with a connecting circuit for correcting pulse shape and code modification; the transmitters and receivers also separate a timing signal from a data signal. Receivers Rx and transmitters Tx are commonly known, e.g., from PCM channelling devices currently in use. Likewise, the time multiplexers and frame phasers to be discussed below are generally known, structural components of digital time division centers.

When a data signal having standard frame and multi-frame structures, e.g., is transmitted to port 1, it is first processed in receiver Rx. The pulse sequence output of receiver Rx is coupled in parallel to time multiplexer 6 and to controllable switch 32. If switch 32 is in the position shown in FIG. 2, the output signal of receiver Rx is coupled directly to transmitter Tx of port 2. When a certain time slot or channel, typically having eight bits, is to be branched to port 3, the eight bits corresponding to this time slot are coupled via time multiplexer 6 and switch 13 to port 3. The switch signal of port 3 is thereby at the same phase as the signal coupled to port 1; the signals coupled to port 1 and derived from port 3 have the same transmission rate, i.e., the same frequency. If one, however, wishes to use a different frequency in the line coupled to port 3, as compared with that of the line coupled to port 1, rate modifier 10 is connected between switch 13 and the transmitter Tx of port 3. Rate modifier 10 comprises, e.g, a phase-locked loop or frequency divider clocked by the bit frequency of the line connected to port 1, if the bit frequency of the line coupled to port 3 is a fraction of the bit frequency of line 1. In such a case the duration of the bits on the line coupled to port 3 is longer than that of the bits on the line coupled to line 1. Time multiplexer 6 arranges the branched time slots or channels so they are located at the desired channel and do not occur in the same time slot as the channels branched from the line coupled to port 2; the channels branched from the line coupled to port 2 are re-arranged by time multiplexer 7. It is advantageous to use a RAM time multiplexer 6. The RAM has one memory location for each particular time, from which location time slots, example eight-bit words, are read in the desired sequence. To correctly transmit the information related to the frame and multiframe synchronization to the signalling of the channels, memory positions are provided in the RAM for the frame and multiframe information.

In the same way as in the case of a signal arriving at port 1, some channels of a data signal coupled to port 2 may be connected either directly via switch 31 to port 1 or to port 3. If it is desirable to pass a certain channel to port 3, the particular channel is coupled via time multiplexer 5 to the switch 23, thence to the frame phaser 9. The frame and multiframe phase of the signal derived from port 2 is modified to correspond to the corresponding phases of the signals derived from port 1. The output of phaser 9 is passed through the time multiplexer 7 and switch 13 to port 3. The time multiplexer 7 is similar to the time multiplexer 6, described above, but multiplexer 7 is provided with two outlets; the channels supplied to multiplexer 7 are read in different sequences from the two outlets thereof.

By means of the branching device in accordance with this invention, the signals derived from port 3 are selectively passed either to gate 1 or to port 2. The data signal coupled to port 3 is first supplied to frame phaser 8, which modifies the phase of the signal so it has the same phase as the phase of signals on the line coupled to port 2, and changes the frequency so it corresponds to the change in frequency change performed by frequency divider 10. The pulses derived from the frame phaser 8 are coupled to time multiplexer 4, which is similar to the time multiplexer 7 described above. Thus, the output signal of phaser 8 is coupled from time multiplexer 4 through switch 31 to port 1. Alternatively, the output of phaser 8 is coupled by multiplexer 4 to switch 23, thence frame phaser 9, which modifies the phase of the signal to bring it into agreement with the phase of the signal derived from port 1, and coupled through the time multiplexer 7 and the switch 32 to port 2.

As is shown by means of broken lines in FIG. 2, the device in accordance with the invention includes two identical units, each comprising two controllable switches, two time multiplexers and a frame phaser. In this way the structure of the device can have a modular form to thereby reduce the manufacturing cost thereof. To each unit is additionally related a control unit CO for controlling the operation of the time multiplexers and the switches. Control unit CO may be in the form, e.g., of a programmable read only memory (PROM), programmed to control the time multiplexers and switches as portions of desired length, whereby extensive variability is obtained for the control unit. If a frame structure in accordance with CCITT recommendation G.732 is used, four bits are sufficient as a control step because bit groups shorter than this need not be controlled separately. Such a four-bit group is required for the channel signalling data which are transmitted once during a multiframe containing 16 frames, wherein one eight-bit signalling time slot always contains the signalling data of two channels. However, if more precise controlling is desired, it may be performed with one-bit precision if the size and programming of the chosen PROM are increased accordingly. Such control is necessary if one wishes to branch signals other than digital signals having a standard frame structure.

Figure 3:
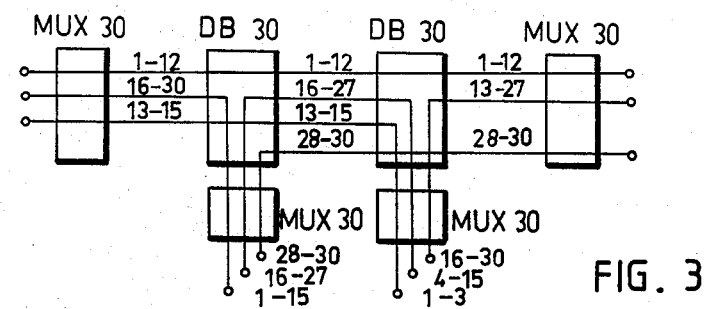
FIG. 3 is a block diagram of a 30-channel system using a device in accordance with the invention.

FIG. 3 is a diagram of an exemplary channel arrangement using branching devices DB30 in accordance with the invention; devices DB30 are connected to 30-channel channelling devices MUX 30. Each of branching devices DB30 is able to branch channels in arbitrary groups and thereby provide connections corresponding to the traffic requirement for each particular case.

The device in accordance with the invention may be modified extensively within the scope of the following patent claims. All of switches 31, 23, 32 and 13 need not be formed as physical components, but can be properly programmed elements, e.g., the result performed by switches 31, 23, 32 and 13 can be attained by reading commands stored at different memory positions. Therefore, the switches are to be understood only as an indication of the existence of two alternative connections.

What is claimed is:

1. A digital multiplex device in an apparatus for branching a synchronous time multiplexed digital information stream between first, second and third ports, each of said ports including a transmitter and receiver, the device comprising first and second selectively activated phase controlling networks, each of said networks including: first and second input terminal means and first and second output terminal means, first and second time division multiplexers, first and second switch means and a phase changer, the first multiplexer being directly connected to the first input terminal means of the respective network, the phase changer having an input directly connected to the second input terminal means of the respective network and an output directly connected to a first input of the second multiplexer of the respective network, the first switch means selectively connecting the first input terminal means of the network to the first output terminal means of the respective network or for connecting a first output of the second phase changer to the first output means of the respective network, the second switch means selectively connecting the second output terminal means to be responsive to an output of the first multiplexer of the respective network or to a second output of the second multiplexer of the respective network; first input terminal means of the first and second networks being adapted to be respectively responsive to output signals of the receivers of the first and second ports, the first output terminal means of the first and second networks being adapted to respectively supply signals to inputs of the transmitters of the first and second ports, the second input terminal means of the second network being adapted to be connected to the second output terminal means of the first network, the second input terminal means of the first network being adapted to be connected to an output of the receiver of the third port, the second output terminal means of the second network being adapted to be connected to an input of the transmitter of the third port.

2. The device of claim 1 wherein each network includes a controller for the first and second switches and the first and second multiplexers of the respective network.

3. The device of claim 2 wherein the controller includes a programmable read only memory.

4. The device of claim 2 wherein each network has the same configuration.

5. A digital multiplex apparatus for selectively branching a synchronous time multiplexed digital information stream comprising first, second and third ports, each of said ports including a transmitter and receiver, the device including first and second selectively activated phase controlling networks, each of said networks including: first and second input terminal means and first and second output terminal means, first and second time division multiplexers, first and second switch means, and a phase changer, the first multiplexer being directly connected to the first input terminal means of the respective network, the phase changer having an input directly connected to the second input terminal means of the respective network and an output directly connected to a first input of the second multiplexer of the respective network, the first switch means selectively connecting the first input terminal means of the network to the first output terminal means of the respective network or for connecting a first output of the second phase changer to the first output means of the respective network, the second switch means selectively connecting the second output terminal means to be responsive to an output of the first multiplexer of the respective network or to a second output of the second multiplexer of the respective network; first input terminal means of the first and second networks being connected to be respectively responsive to output signals of the receivers of the first and second ports, the first output terminal means of the first and second networks being connected to respectively supply signals to inputs of the transmitters of the first and second ports, the second input terminal means of the second network being connected to the second output terminal means of the first network, the second input terminal means of the first network being connected to an output of the receiver of the third port, the second output terminal means of the second network being connected to an input of the transmitter of the third port.

6. The apparatus of claim 5 further including frequency changing means connected between the second output terminal means of the second network and the input of the transmitter of the third means.

7. The apparatus of claim 5 wherein each network includes a controller for the first and second switches and the first and second multiplexers of the respective network.

8. The apparatus of claim 7 wherein the controller includes a programmable read only memory.

9. The apparatus of claim 5 wherein each network has the same configuration.

* * * * *

UNITED STATES PATENT AND TRADEMARK OFFICE
CERTIFICATE OF CORRECTION

PATENT NO. : 4,574,373
DATED : March 4, 1986
INVENTOR(S) : Reijo AHOLA

It is certified that error appears in the above-identified patent and that said Letters Patent is hereby corrected as shown below:

On the Title Page,

[73] Assignee: Oy Nokia Ab, Helsinki, Finland

Signed and Sealed this

Twenty-eighth Day of October, 1986

[SEAL]

*Attest:*

DONALD J. QUIGG

*Attesting Officer*      *Commissioner of Patents and Trademarks*